W. C. McCARTHY.
Instrument for Measuring Liquids in Casks.
No. 51,069. Patented Nov. 21, 1865.
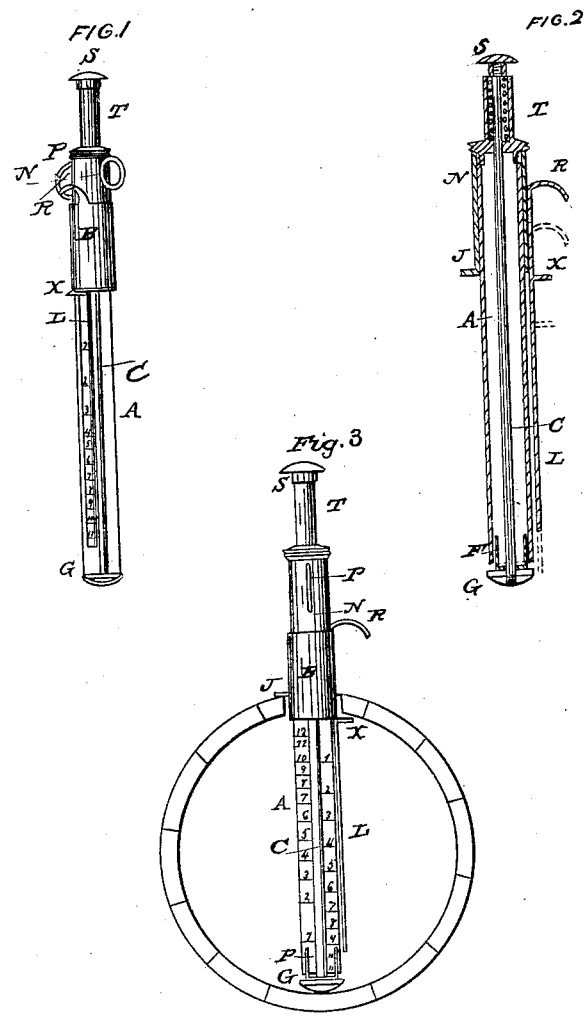

UNITED STATES PATENT OFFICE.

WM. C. McCARTHY, OF PITTSBURG, PENNSYLVANIA.

IMPROVEMENT IN INSTRUMENTS FOR MEASURING LIQUIDS IN CASKS.

Specification forming part of Letters Patent No. 51,069, dated November 21, 1865; antedated May 21, 1865.

*To all whom it may concern:*

Be it known that I, WILLIAM C. MCCARTHY, of the city of Pittsburg, in the county of Allegheny, and State of Pennsylvania, have invented a new and useful improvement in that class of instruments used for determining by actual measurement the number of gallons or quantity of liquid in barrels or casks; and I hereby declare that the following is a full, clear, and exact description of my invention, reference being had to the accompanying drawings, forming part of this specification, and to the letters of reference marked thereon.

The method heretofore in use for ascertaining the quantity of liquid in barrels is accomplished by first determining the capacity of the cask by the use of what is known as a "diagonal rod," or by means of calipers. The ullage or amount it wants of being full is next sought by inserting a short gaged rod through the bung-hole in a vertical direction into the liquid. This rod, called an "out-stick," being furnished with a small projection on one side, intended to catch against the under part of the stave, that portion of the out-stick beneath the projection remaining dry represents the ullage, which, on being deducted from capacity, gives the contents. But where barrels contain two or more liquids of different degrees of density or gravity, having no affinity for each other—as, for instance, water and oil—the water, being the heavier of the two, sinks and remains at the bottom, and no means have heretofore been discovered to indicate with any degree of certainty the depth or quantity beneath.

My invention is designed to exhibit not only the depth of water and the height that the oil may stand above it, but in connection therewith the ullage or vacant space between the liquid and top of the barrel, whereby a better estimate of the quantity of oil or water may be made.

To enable others to accomplish this by means of my invention, I will proceed to describe its construction and operation by reference to the accompanying drawings, in which—

Figure 1 represents a perspective view of my improved apparatus. Fig. 2 is a transverse vertical section of the same. Fig. 3 represents the section of a barrel with the instrument therein.

All the drawings are lettered, and similar letters denote corresponding parts in the several views.

I construct my apparatus by forming a graduated glass tube, A, about one inch in diameter and of sufficient length to reach from the bung-hole to the bottom of the barrel. This tube has engraved or otherwise affixed on it a scale of figures indicating the number of gallons and inches from top to bottom and from bottom to top. The upper portion of this tube is inclosed by a metallic cap or casing, N, to which are attached a couple of rings, P P, large enough to admit the fingers of the operator, and is also furnished with a projecting catch, J, to rest on the stave of the barrel at the side of the bung-hole. Passing through the top of this cap or casing N and down through the interior of the glass tube A is a long metallic rod, C, the lower end terminating in a small brass disk supporting an elastic washer, G, a little larger in diameter than the mouth of the tube, forming a perfectly air-tight valve, guided in its motions by the short vertical pins F attached thereto. That part of the rod C extending above the cap N is surrounded by a spiral spring inclosed in a small metallic tube, T, which acts as a stop or check to the button or knob on top of the rod C and prevents the valve at the bottom of the glass from being opened too wide, and its subsequent displacement.

In connection with the stationary scale of figures on the glass tube A is a sliding scale, L, having the figures stamped on a narrow strip of metal extending nearly to the bottom of the glass. This scale is secured to the casing N by a cylindrical clasp, B, furnished with a projecting piece, X, to catch on the under side of the stave, and is provided with a finger-hook, R, for the purpose of moving the scale up or down as desired, and indicated by the dotted lines in Fig. 2.

The apparatus having been constructed as above stated, its operation is as follows: The capacity of the cask or barrel ascertained, the operator inserts his fingers in the rings P P so that the palm of his hand rests on the knob S, when, by pressing down, the spiral spring will be compressed and the valve G at the bottom of the tube A opened. In this condition it is then inserted slowly through the liquid to the bottom of the barrel, taking care to give the tube time to fill or the liquid to rise in it to the height it stands in the barrel. As soon as this is accomplished the valve is allowed to close by taking the pressure off the knob S at the top of the rod. The operator then draws up the sliding gage L by means of the hook R until the projecting piece X catches against the under side of the stave, and in this condition the apparatus is moved to the other side of the bung-hole, to free the catch, and lifted out, the liquid in the transparent tube indicating, by reference to the figures thereon, the depth of oil and water and the number of gallons, while the figures on the sliding scale denote the amount of ullage or vacant space between the top or surface of liquid and the bung-hole.

Having thus described my invention, what I claim is—

1. A transparent gaging-tube, with or without a metallic casing, with openings to see through, having a scale of figures engraved or otherwise affixed thereon, and a valve at the bottom operated by a rod and spring, substantially in the manner and for the purposes herein set forth.

2. Combining with the transparent tube and valve a sliding or stationary scale to indicate the ullage, substantially as hereinbefore stated.

WM. C. McCARTHY.

Witnesses:
JOSIAH W. ELLS,
CHRIS. MAGEE.